United States Patent [19]

Martin

[11] Patent Number: 4,524,195
[45] Date of Patent: Jun. 18, 1985

[54] PROCESS AND CATALYST FOR OLEFIN POLYMERIZATION

[75] Inventor: Joel L. Martin, Bartlesville, Okla.

[73] Assignee: Phillips Petroleum Company, Bartlesville, Okla.

[21] Appl. No.: 543,582

[22] Filed: Oct. 19, 1983

[51] Int. Cl.$^3$ .......................... C08F 4/02; C08F 10/00
[52] U.S. Cl. .................................... 526/114; 502/104; 502/113; 502/121; 526/115; 526/122; 526/125; 526/352
[58] Field of Search ...................... 502/104, 113, 121; 526/114, 115, 122, 125

[56] References Cited

U.S. PATENT DOCUMENTS

| | | | |
|---|---|---|---|
| 3,238,146 | 3/1966 | Hewett et al. | 526/125 |
| 3,642,746 | 2/1972 | Kashiwa et al. | 526/125 |
| 3,708,551 | 1/1973 | Kitteman et al. | 260/683 D |
| 3,812,089 | 5/1974 | Tashiro et al. | 526/125 |
| 4,217,245 | 8/1980 | Corbellino et al. | 526/114 |
| 4,304,729 | 12/1981 | Creco et al. | 526/125 |
| 4,330,649 | 5/1982 | Kioka et al. | 526/125 |

OTHER PUBLICATIONS

Chemical Abstracts, 93:96152v (1980).
Macromolecules 5, 230, 233 (1982).
J. Poly. Sci.: Poly. Chem. Ed., 18, 3345–3357 (1980).

Primary Examiner—Edward J. Smith
Attorney, Agent, or Firm—Edward L. Bowman

[57] ABSTRACT

Solid olefin polymerization catalysts are prepared by forming a solution of an organophosphate or organophosphoramide and certain metal halides and then reacting the solution with a halogenated transition metal compound to form a solid.

29 Claims, No Drawings

PROCESS AND CATALYST FOR OLEFIN POLYMERIZATION

This invention relates to a process for producing polymers from alpha-olefins and to a catalyst for use in the process.

BACKGROUND

In the polymerization of alpha-olefins, it is known to use catalyst systems comprising a transition metal compound and an organometallic compound. It is further known that the productivity of such catalysts can generally be improved if the transition metal compound is employed in conjunction with a metal halide such as magnesium halide. U.S. Pat. No. 3,642,746 discloses that particularly active catalysts can be prepared by pretreating solid particles of a dihalide of a divalent metal such as $MgCl_2$ with an electron donor and then heating the thus pretreated solid with a transition metal compound such as $TiCl_4$.

An object of the present invention is to provide a method for preparing more highly active olefin polymerization catalysts.

Another object is to provide a new process for polymerizing olefins using such catalyst.

SUMMARY OF THE INVENTION

In accordance with the present invention, there is provided a solid olefin polymerization catalyst produced by (1) forming a solution by using an organophosphate or organophosphoramide to cause the dissolution of at least one metal halide selected from the group consisting of the completely halogenated halides of magnesium, calcium, zinc, chromium, manganese, iron, cobalt, nickel, scandium, yttrium and rare earth metals having atomic numbers in the range of 57 to 71, in a dry organic liquid, and then (2) reacting said solution with a halogen compound of a transition metal to produce said solid.

DETAILED DESCRIPTION OF THE INVENTION

The organophosphates and organophosphoramides contemplated for use in the present invention are those which are capable of causing the metal halide to go into solution. Typical organophosphates would include those of the formula $(RO)_3PO$ wherein each R can be the same of different hydrocarbyl radical containing 1 to 10 carbon atoms. Typical representative examples of such compounds include tri-n-butyl phosphate, triethyl phosphate, triphenyl phosphate, and the like and mixtures. The currently preferred phosphates are those wherein each R is an alkyl radical containing 1 to 6 carbon atoms. Typical organophosphoramide would include those of the formula $(R_2N)_3PO$. Representative examples of such compounds include hexamethylphosphoramide, hexaethylphosphoramide, and the like and mixtures.

The metal halides include the chlorides, bromides, and iodides of the specified metals. They are preferably used in a substantially anhydrous form. Representative examples of such metal halides include magnesium dichloride, magnesium diiodide, magnesium dibromide, manganese dichloride, lanthanum trichloride, cerium trichloride, praseodymium trichloride, samarium trichloride, erbium trichloride, gadolinium trichloride, neodymium trichloride, dysprosium trichloride and the like.

The liquid employed for forming the solution should be dry, i.e. substantially free of water. Typically the liquid is an organic liquid which is liquid at normal room temperatures, viz. 50° F. to 90° F. Typical liquids include, for example, normally liquid hydrocarbons having 3 to 12 carbon atoms per molecule, such as n-pentane, n-heptane, methylcyclohexane, toluene, xylenes, and the like. The currently preferred liquids are aliphatic hydrocarbons containing 4 to 8 carbon atoms per molecule.

The amount of organophosphate or organophosphoramide needed to cause the dissolution of the metal halide can vary depending upon the metal halide selected and the desired level of dissolution of the metal halide. Typically for the divalent metal halides about 1.5 to 2 moles of organophosphate or organophosphoramide per mole of metal halide is sufficient for optimum dissolution. Typically for the trivalent metal halides about 3 to 4 moles of organophosphate or organophosphoramide per mole of metal halide gives the best results.

Generally best dissolution occurs if the temperature of the liquid is raised above normal room temperature, say to a temperature in the range of about 80° to about 120° C. The amount of liquid in some cases is preferably adjusted to reduce the viscosity of the solution.

The transition metal halogen compounds employed in the present invention include any which will react with the solution to produce a solid. Typical halogenated transition metal compounds include the halogen compounds of trivalent and tetravalent titanium such as titanium trichloride, titanium tetrachloride, titanium tetrabromide, titanium tetraiodide, titanium ethoxytrichloride, titanium diethoxydichloride, titanium butoxytrichloride, and titanium dibutoxydichloride; and the halogen compounds of tetra- and pentavalent vanadium such as vanadium tetrachloride, and vanadium oxytrichloride.

The undissolved solids can be removed from the solution before it is contacted with the transition metal halogen compound. This can be done in any conventional manner such as by careful decanting or filtering.

The amount of transition metal halide that can be employed can vary over a wide range, including the use of an excess over that needed to obtain the maximum yield of solids. Typically the molar ratio of the transition metal compound to the metal halide should be preferably at least in the range of 5/1 to 25/1.

Generally and for best results the mixture should be heated after the transition metal halide is added. Typical temperatures for the heating are within the range of about 80° C. to about 120° C. It is further generally preferred that the mixture be stirred after the addition of the transition metal halide. The rate of stirring can effect the particle size of the resulting solid with the smaller particle size solid being provided by more rapid stirring and generally providing the more active catalysts.

The precautions generally used in handling and preparing transition metal catalysts such as protection from oxygen and water should be used for best results.

The catalyst solids can be recovered from the reaction liquid using conventional techniques and is preferably washed with hydrocarbon prior to use to remove excess transition metal compound.

The inventive catalyst composition is useful for the polymerization of olefins. Typical polymerizable olefins include the aliphatic monoolefins having 2 to 18 carbon atoms. The term polymerization is used herein to include both homo- and copolymerization. In copolymerization other polymerizable monomers can be employed with the olefins. Examples include conjugated and nonconjugated dienes such as 1,3-butadiene, isoprene, 1,5-hexadiene, etc.

The inventive catalyst is particularly well suited for the preparation of ethylene homopolymers and copolymers which contain at least 90 mole percent, and preferably 95 mole percent ethylene.

In the polymerization of olefins, the inventive catalyst composition is used with a suitable cocatalyst of the type generally used with titanium-containing olefin polymerization catalysts. Typical examples include organometallic compounds of Groups IA, IIA, IIB, and IIIA of the Periodic Table, i.e. alkali metal alkyls or aryls, dialkylmagnesium, dialkylzinc, Grignard reagents, and organoaluminum compounds.

It is presently preferred that the cocatalyst be an organoaluminum compound of the formula $AlR'_m Y_{3-m}$ wherein each $R'$ is a hydrocarbyl radical, each individually selected from the group consisting of alkenyl, alkyl, cycloalkyl, aryl, alkaryl, and aralkyl radicals containing 1 to 20 carbon atoms, Y is a monovalent radical selected from hydrogen and the halogens, and m is a number in the range of 1 to 3.

Examples of specific compounds include trimethylaluminum, triethylaluminum, triisobutylaluminum, tridodecylaluminum, trieicosylaluminum, tricyclohexylaluminum, triphenylaluminum, triisopropenylaluminum, tribenzylaluminum, diethylaluminum chloride, ethylaluminum dichloride, isopropylaluminum dibromide, diisobutylaluminum hydride, and the like, and mixtures thereof.

For the polymerization of monomers consisting predominantly of ethylene, it is currently preferred to use a trialkylaluminum cocatalyst such as triethylaluminum.

The amount of cocatalyst employed with the catalyst during the polymerization process can vary rather widely. Generally, about 0.1 to 10 mmoles of cocatalyst is employed per liter of hydrocarbon diluent employed in the reactor during polymerization. The amount of solid catalyst employed with the cocatalyst can vary depending upon its activity. Typically, about 1 to about 50 mg of catalyst is employed per liter of diluent.

The catalyst system of this invention, that is the catalyst and cocatalyst, can be employed in a batchwise or in a continuous polymerization process.

In a batch process of polymerizing ethylene, for example, a stirred autoclave is conditioned by purging with dry nitrogen and then with the hydrocarbon diluent that is to be employed in the polymerization process such as isobutane, for example. Generally, although order is immaterial, the cocatalyst is charged through an entry port followed by the catalyst. After closing the port, hydrogen, if used, is added, and the hydrocarbon diluent is then charged. The reactor is then heated to the desired reaction temperature, e.g. about 50° to about 120° C., the ethylene is admitted and maintained at a partial pressure within a range of about 0.5 to about 5.0 MPa (70–725 psig). At the end of the reaction period, generally about 1 hour for bench scale testing, the polymerization reaction is terminated by venting unreacted olefin and diluent.

The reactor is then opened and the free-flowing white ethylene polymer is collected, dried, and weighed.

In a continuous process, for example, a suitable reactor such as a loop reactor is continuously charged with suitable quantities of solvent or diluent, catalyst, cocatalyst, olefin, and hydrogen, if used. The reactor product is continuously or intermittently withdrawn, and the polymer recovered, e.g. flashing diluent and unreacted olefin and drying the product.

A further understanding of the present invention and its advantages will be provided by the following examples:

EXAMPLE I

Catalyst Preparations

The general procedure employed involved suspending the metal halide in n-heptane (10 mL unless otherwise noted) in a glass reactor under an atmosphere of nitrogen or argon. Tri-n-butyl phosphate (except as noted below where triethyl phosphate was employed) was added to the suspension which was then heated at 100° C. for one hour (unless otherwise noted below). After the reaction mixture was cooled to room temperature, titanium tetrachloride was added and the resulting mixture was heated, generally with vigorous stirring, at 100° C. for two hours (unless otherwise noted below). The resulting suspension was placed under an argon atmosphere for filtration and subsequent washing of the solid product with n-hexane followed by drying.

Table 1 identifies the metal halide as well as amounts of components and exceptions to the above-stated procedure. The product weights and amounts of titanium and chlorine in the products are also given in Table 1.

TABLE 1

| Run | Metal Halide (M) | Ti/P/M$^a$ mL/mL/g | Molar Ratio | Product Wt, g | % Ti$^g$ | % Cl$^h$ |
|---|---|---|---|---|---|---|
| 1C | CeCl$_3$ | 5/2.21/0.5 | 45/8/2 | 1.2 | 4.6 | —$^i$ |
| 2C | " | 5/2.21/0.5 | 45/8/2 | 0.41 | 1.4 | — |
| 3C | PrCl$_3$ | 5/2.21/0.5 | 45/8.1/2 | 1.02 | 3.8 | — |
| 4C | " | 5/2.21/0.5 | 45/8.1/2 | 0.95 | 5.3 | 31.1 |
| 5C | " | 5/2.21/0.5 | 45/8.1/2 | 0.59 | 1.7 | — |
| 6C$^b$ | NdCl$_3$ | 5/1.02/0.5 | 45/6/2 | 1.83 | 5.9 | 31.5 |
| 7C | " | 5/1.63/0.5 | 45/6/2 | 1.19 | 4.9 | 31.1 |
| 8C | " | 20/6.52/2.0$^f$ | 45/6/2 | 5.41 | 6.7 | — |
| 9C | " | 5/1.65/0.5 | 45/6/2 | 1.66 | 9.0 | — |
| 10C | SmCl$_3$ | 5/1.59/0.5 | 45/6/2 | 0.90 | 3.3 | — |
| 11C | GdCl$_3$ | 5/1.63/0.5 | 45/6/1.9 | 1.39 | 11.3 | — |
| 12C | " | 5/1.63/0.5 | 45/6/1.9 | 0.96 | 6.4 | — |
| 13C | " | 5/1.65/0.5 | 45/6/1.9 | 0.76 | 7.4 | — |
| 14C | DyCl$_3$ | 5/1.52/0.5 | 45/5.6/1.9 | 1.41 | 12.6 | — |
| 15C | ErCl$_3$ | 5/1.49/0.5 | 45/5.5/1.8 | 0.79 | 3.0 | — |
| 16C$^c$ | LaCl$_3$ | 5/2.21/0.5 | 45/8.1/2 | 1.21 | 6.5 | — |
| 17C$^d$ | " | 5/1.65/0.5 | 45/6.3/2 | 1.09 | 6.9 | — |
| 18C$^e$ | " | 5/2.2/0.5 | 45/8.1/2 | 1.09 | 6.2 | — |
| 19C | MgCl$_2$ | 5/2.86/0.5 | 8.57/2/1 | 1.1 | 4.9 | — |
| 20C | " | 5/2.86/0.5 | 8.57/2/1 | 1.05 | 5.6 | 63.8 |
| 21C | MnCl$_2$ | 5/2.16/0.5 | 11.25/2/1 | 0.7 | 4.4 | — |

TABLE 1-continued

| Run | Metal Halide (M) | Ti/P/M$^a$ mL/mL/g | Molar Ratio | Product Wt, g | % Ti$^g$ | % Cl$^h$ |
|---|---|---|---|---|---|---|
| 22C | " | 5/2.16/0.5 | 11.25/2/1 | 0.8 | 4.4 | — |

$^a$TiCl$_4$/(RO)$_3$PO/metal halide amounts of components charged to reactor.
$^b$Triethyl phosphate was used.
$^c$LaCl$_3$, (BuO)$_3$PO and heptane (10 mL) heated at 100° C. for 19.5 hours gave a nonpourable solution. Added 20 mL additional heptane prior to addition of TiCl$_4$ which thinned the reaction mixture considerably.
$^d$LaCl$_3$, (BuO)$_3$PO and heptane (20 mL) heated at 100° C. for about 26 hours gave viscous mixture. Added 20 mL additional heptane and heated at 100° C. for 24 hours to give more viscous solution. An additional 20 mL heptane resulted in slightly reduced viscosity. Addition of TiCl$_4$ immediately reduced viscosity drastically.
$^e$LaCl$_3$, (BuO)$_3$PO and heptane (20 mL) were heated at 100° C. for 24 hours to give very viscous solution. Addition of TiCl$_4$ immediately thinned the reaction mixture.
$^f$40 mL n-heptane was used.
$^g$Weight percent titanium metal determined by the method of Vogel, "Textbook of Quantitative Inorganic Analysis," 1961, John Wiley and Sons, N.Y., 3rd ed., p. 778.
$^h$Determined by Volhard titration of sulfuric acid solution.
$^i$Hyphen denotes "not determined".

The variation in the amount of product and the amount of titanium in the product of identical runs is attributed at least in part to different lots and origins of metal halides.

EXAMPLE 2

Polymerization

The solid products described above were used as catalysts with triethylaluminum as cocatalyst for the polymerization of ethylene.

All polymerizations were carried out at 100° C. for one hour in a 1 gallon, packed, Autoclave Engineers, stirred reactor. The ΔP for H$_2$ was 60 psig and for ethylene 230 psig. The autoclave was partly filled with heptane and heated to above 150° C. Hot heptane was flushed out through the bottom valve with nitrogen and the heating continued for 10 minutes before flushing the reactor with nitrogen and the heating continued for 10 minutes before flushing the reactor with nitrogen and isobutane 3 times. Cooling water was circulated through the jacket to bring the temperature below 40° C. at which time cocatalyst, catalyst, hydrogen and then 2L of isobutane were charged. After raising the temperature to 100° C. ethylene was added to give the desired pressure and maintained at that pressure for 1 hour by admitting ethylene as required from a pressurized reservoir. Following venting the volatiles to a flare line, the dry polymer was removed from the reactor, dried, weighed and stabilized with a conventional antioxidant, e.g. 2,6-di-tert-butyl-4-methylphenol.

Table 2 gives the polymerization variables, polymer yield, catalyst productivity and polymer properties.

TABLE 2

| Run | Catalyst No.$^a$ | M | Wt., g | TEA$^b$, mL | Polymer, g | Productivity$^c$ | MI$^d$ | HLMI/MI$^e$ |
|---|---|---|---|---|---|---|---|---|
| 1P | 1C | Ce | 0.0285 | 0.3 | 58 | 2030 | 0.23 | 34.3 |
| 2P | 2C | " | 0.0233 | 0.3 | 71 | 3050 | 0.63 | 27.9 |
| 3P | 3C | Pr | 0.0124 | 0.3 | 304 | 24500 | 0.50 | 27.2 |
| 4P | 4C | " | 0.0340 | 0.3 | 560 | 16500 | 1.2 | 24.3 |
| 5P | 5C | " | 0.0202 | 0.6 | 95 | 4700 | 0.45 | 115. |
| 6P | 6C | Nd | 0.0341 | 0.3 | 108 | 3170 | 0.40 | 27.0 |
| 7P | 7C | " | 0.0278 | 0.3 | 506 | 18200 | 0.51 | 24.9 |
| 8P | 8C | " | 0.0123 | 0.3 | 483 | 39300 | 0.21 | 21.4 |
| 9P | 9C | " | 0.0209 | 0.6 | 291 | 13900 | 0.15 | 33.8 |
| 10P | 10C | Sm | 0.0437 | 0.3 | 157 | 3590 | 0.54 | 24.6 |
| 11P | 11C | Gd | 0.0305 | 0.3 | 85 | 2790 | 0.18 | 34.4 |
| 12P | 12C | " | 0.0395 | 0.3 | 200 | 5060 | 0.15 | 24.3 |
| 13P | 13C | " | 0.0121 | 0.3 | 129 | 10700 | 0 | — |
| 14P | 14C | Dy | 0.0631 | 0.3 | 25 | 400 | 0.04 | 42. |
| 15P | 15C | Er | 0.0295 | 0.3 | 62 | 2100 | 0.13 | 42.3 |
| 16P | 16C | La | 0.0190 | 0.3 | 59 | 3110 | 0.27 | 40.7 |
| 17P | 17C | " | 0.0145 | 0.6 | 103 | 7100 | 0.10 | 98.6 |
| 18P | 18C | " | 0.0144 | 0.6 | 125 | 8680 | 0.23 | 45.9 |
| 19P | 19C | Mg | 0.0334 | 0.3 | 170 | 5090 | 0.72 | 24 |
| 20P | 20C | " | 0.0267 | 0.3 | 735 | 27500 | 1.6 | 24 |
| 21P | 21C | Mn | 0.0299 | 0.3 | 122 | 4080 | 0.22 | 30.4 |
| 22P | 22C | " | 0.0237 | 0.3 | 33 | 1390 | 0.36 | 30.8 |

$^a$Catalyst numbers are from Table 1.
$^b$Triethylaluminum as 25 weight percent solution in n-heptane.
$^c$Expressed as grams polymer per gram catalyst per hour.
$^d$MI = Melt index - ASTM D1238, condition E.
$^e$HLMI = High load melt index - ASTM D1238, condition F.

The data in Table 2 demonstrate the utility of the inventive catalysts in preparing polyethylene. It is noteworthy that broad molecular weight distribution polymers were obtained as seen from the relatively high HLMI/MI values. The data suggest that doubling the TEA concentration from 0.3 ml to 0.6 mL result in broadened molecular weight distribution polymers being made. It is also noteworthy that several of the inventive catalysts, especially those based on praeseodymium, magnesium, neodymium, and gadolinium gave more than 10,000 grams of polymer per gram of catalyst per hour. Variations that occur in the runs using a given halide are attributed at least in part to particle size variations occurring as a result of variations in the amount of mixing encountered during the catalyst preparation.

The polymers produced according to the present invention have numerous applications which will be obvious to those skilled in the art from their properties. Typical applications include fibers, films, pipe, containers, and the like which can be made with conventional plastics fabrication equipment.

What is claimed is:

1. A process for preparing a solid catalyst suitable for the polymerization of alpha-olefins comprising
   (1) forming a solution by using an organophosphate or organophosphoramide to cause the dissolution of at least one metal halide selected from the group consisting of the completely halogenated halides of rare earth metals having atomic numbers in the range of 57 to 71 in a dry organic liquid and then (2) reacting said solution with a halogen compound of a transition metal to produce said solid.

2. A process according to claim 1 wherein said organophosphate has the formula $(RO)_3PO$ wherein each R is an alkyl radical containing 1 to 6 carbon atoms.

3. A process according to claim 2 wherein said halogen compound of a transition metal compound is selected from the group consisting of titanium trichloride, titanium tetrachloride, titanium tetrabromide, titanium tetraiodide, titanium ethoxytrichloride, titanium butoxytrichloride, titanium diethoxydichloride, and titanium dibutoxydichloride.

4. A process according to claim 3 wherein said dry liquid is an aliphatic hydrocarbon containing 4 to 8 carbon atoms per molecule.

5. A process according to claim 1 wherein said metal halide is selected from neodymium trichloride, praseodymium trichloride, gadolinium trichloride, and lanthium trichloride.

6. A process according to claim 4 wherein said transition metal compound is titanium tetrachloride.

7. A process according to claim 6 wherein said organophosphate is tri-n-butyl phosphate.

8. A process according to claim 7 wherein said dry liquid is n-heptane.

9. A process according to claim 4 wherein said metal halide consists essentially of one or more rare earth metal halide selected from the group consisting of lanthanum trichloride, erbium trichloride, cerium trichloride, praseodymium trichloride, samarium trichloride, gadolinium trichloride, neodymium trichloride, and dysprosium trichloride.

10. A process according to claim 9 wherein said transition metal compound is titanium tetrachloride.

11. A process according to claim 10 wherein said organophosphate is tri-n-butyl phosphate.

12. A process according to claim 11 wherein said dry liquid is n-heptane.

13. A process according to claim 12 wherein said metal halide consists essentially of neodymium trichloride.

14. A process according to claim 12 wherein said metal halide consists essentially of praseodymium trichloride.

15. A process according to claim 12 wherein said metal halide consists essentially of gadolinium trichloride.

16. A catalyst suitable for the polymerization of alpha-olefins comprising the solid of the process of claim 1.

17. A catalyst according to claim 16 prepared from an organophosphate having the formula $(RO)_3PO$ wherein each R is an alkyl radical containing 1 to 6 carbon atoms and $TiCl_4$.

18. A catalyst according to claim 17 wherein said organophosphate consists essentially of tri-n-butylphosphate.

19. A catalyst according to claim 18 wherein said metal halide is selected from neodymium trichloride, praseodymium trichloride, gadolinium trichloride, and lanthium trichloride.

20. A catalyst according to claim 18 wherein said metal halide consists essentially of neodymium trichloride.

21. A catalyst according to claim 18 wherein said metal halide consists essentially of praseodymium trichloride.

22. A catalyst according to claim 18 wherein said metal halide consists essentially of gadolinium trichloride.

23. A process for the polymerization of alpha-olefin monomers comprising contacting said monomers with a catalyst as set forth in claim 16 and a cocatalyst comprising organometallic compounds of metals of Groups IA, IIA, IIB, and IIIA.

24. A process according to claim 23 wherein said cocatalyst comprises an organoaluminum compound of the formula $AlR'_m Y_{3-m}$ wherein each R' is a hydrocarbyl radical, each individually selected from the group consisting of alkenyl, alkyl, cycloalkyl, aryl, alkaryl, and aralkyl radicals containing 1 to 20 carbon atoms, Y is a monovalent radical selected from hydrogen and the halogens, and m is a number in the range of 1 to 3.

25. A process of claim 24 wherein the organophosphate employed in making the catalyst consists essentially of tri-n-butylphosphate.

26. A process according to claim 25 wherein said metal halide is selected from neodymium trichloride, praseodymium trichloride, gadolinium trichloride, and lanthium trichloride.

27. A process according to claim 25 wherein said metal halide consists essentially of neodymium trichloride.

28. A process according to claim 25 wherein said metal halide consists essentially of praseodymium trichloride.

29. A process according to claim 25 wherein said metal halide consists essentially of gadolinium trichloride.

* * * * *